(12) United States Patent
Chen et al.

(10) Patent No.: US 10,574,764 B2
(45) Date of Patent: Feb. 25, 2020

(54) AUTOMATED LEARNING UNIVERSAL GATEWAY

(71) Applicant: FUJITSU LIMITED, Kawasaki-shi, Kanagawa (JP)

(72) Inventors: Wei-Peng Chen, Fremont, CA (US); Mehdi Bahrami, Santa Clara, CA (US); Takuki Kamiya, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 202 days.

(21) Appl. No.: 15/373,799

(22) Filed: Dec. 9, 2016

(65) Prior Publication Data
US 2018/0167467 A1 Jun. 14, 2018

(51) Int. Cl.
| | |
|---|---|
| H04L 29/08 | (2006.01) |
| H04W 12/00 | (2009.01) |
| H04W 4/50 | (2018.01) |
| H04L 12/24 | (2006.01) |
| G06N 20/00 | (2019.01) |
| H04W 4/70 | (2018.01) |
| G06F 8/65 | (2018.01) |
| H04L 12/66 | (2006.01) |
| H04W 12/08 | (2009.01) |

(52) U.S. Cl.
CPC .............. *H04L 67/16* (2013.01); *G06F 8/65* (2013.01); *G06N 20/00* (2019.01); *H04L 12/66* (2013.01); *H04L 41/12* (2013.01); *H04L 41/22* (2013.01); *H04L 67/22* (2013.01); *H04L 67/36* (2013.01); *H04W 4/50* (2018.02); *H04W 4/70* (2018.02); *H04W 12/00* (2013.01); *H04L 41/5054* (2013.01); *H04L 67/34* (2013.01); *H04W 12/00522* (2019.01); *H04W 12/08* (2013.01)

(58) Field of Classification Search
None
See application file for complete search history.

(56) References Cited

U.S. PATENT DOCUMENTS

| | | | |
|---|---|---|---|
| 8,884,774 B2 | 11/2014 | Sanderford | |
| 2011/0145369 A1* | 6/2011 | Chen | G06F 16/955 709/219 |
| 2012/0117232 A1* | 5/2012 | Brown | G06Q 10/10 709/224 |

(Continued)

*Primary Examiner* — Shirley X Zhang
(74) *Attorney, Agent, or Firm* — Maschoff Brennan

(57) ABSTRACT

A gateway includes a communication interface and a processor. The processor is configured to receive, via the communication interface, a graphical representation of a device to be connected to the gateway, the graphical representation being in an electronic format. The processor is further configured to identify the device using the graphical representation to locate a record for the device in an electronic data storage. The processor is configured to search, connect and interact with a variety of the Internet of Things (IoT) devices or services. The processor is also configured to record and/or monitor all connected devices. The processor is also configured to provide a recommendation for the possible connection via a graphical user interface based on monitored/recorded patterns, which are permitted. The processor is configured to learn the monitored/recorded patterns based machine learning methods and trigger some actions with users' permissions or recommend a set of services to users.

20 Claims, 5 Drawing Sheets

(56) References Cited

U.S. PATENT DOCUMENTS

| | | | | |
|---|---|---|---|---|
| 2013/0103847 A1* | 4/2013 | Brown | ................ | H04L 63/083 |
| | | | | 709/229 |
| 2013/0334298 A1* | 12/2013 | Sakpal | .............. | G06F 17/30879 |
| | | | | 235/375 |
| 2014/0022397 A1* | 1/2014 | Huang | ............... | H04N 5/23206 |
| | | | | 348/207.1 |
| 2014/0304381 A1* | 10/2014 | Savolainen | ......... | H04L 41/0806 |
| | | | | 709/222 |
| 2015/0333965 A1* | 11/2015 | Lee | ........................ | H04L 45/02 |
| | | | | 370/254 |
| 2016/0065653 A1 | 3/2016 | Chen et al. | | |
| 2017/0053159 A1* | 2/2017 | Oh | .......................... | G06F 3/041 |
| 2017/0195827 A1* | 7/2017 | Vasko | ................... | H04W 12/08 |
| 2018/0285463 A1* | 10/2018 | Choi | ..................... | G06Q 50/10 |

\* cited by examiner

AUTOMATED LEARNING UNIVERSAL GATEWAY

FIELD

The embodiments discussed herein are related to an automated learning universal gateway.

BACKGROUND

A gateway often refers to a hardware device that is equipped for interfacing with another network or module that may use different protocols. A gateway may contain a variety of devices, such as protocol translators for interacting with different protocols, fault isolators, or signal translators as necessary to provide system interoperability.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a gateway includes a communication interface and a processor operatively coupled to the communication interface. The processor is configured to receive, via the communication interface, a graphical representation of a device to be connected to the gateway, wherein the graphical representation is in an electronic format. The processor is further configured to identify the device using the graphical representation of the device to locate a record for the device in an electronic data storage. The processor is configured to search for a possible connection between the device and an available second device or service. The processor is also configured to provide a recommendation for the possible connection for display via a graphical user interface. The processor is configured to receive an electronic confirmation to enable the possible connection of the device.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
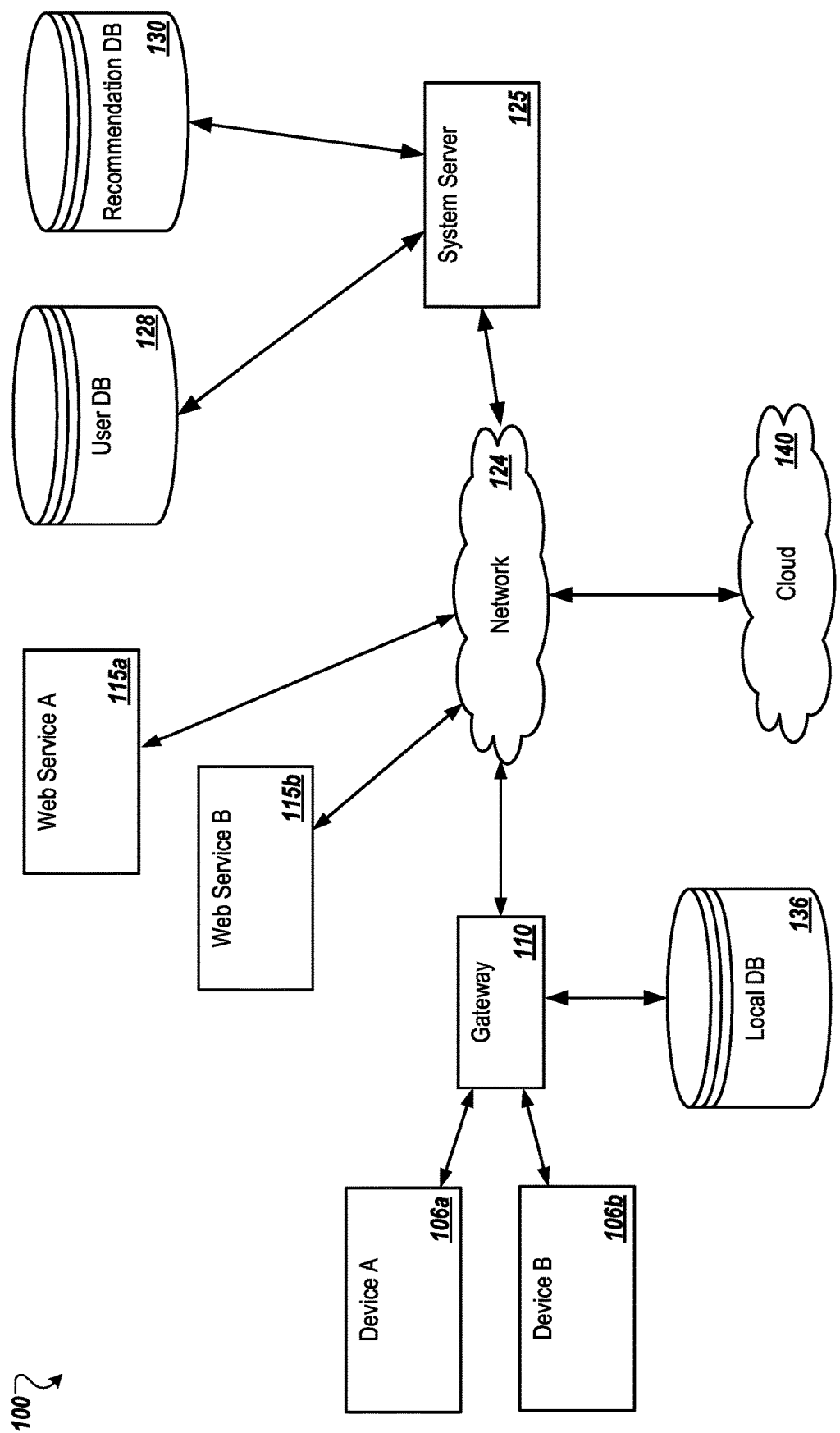
FIG. 1 illustrates a block diagram of an example operating environment of a system that includes a gateway.

Technology advances in hardware and communication systems make small devices more powerful and better able to communicate with one another. These devices often connect to a gateway in various environment, such as home, vehicle, or the Internet of Things (IoT) environments. IoT creates many useful functions, such as automation, surveillance, and the like. However, IoT is intrinsically diverse, fragmented, and sector-specific. Many vendors tend to create independent ecosystems that prohibit incorporation of devices from other vendors. As a result, users with a first type of device may be limited as to the other types of devices that they may use with the first type of device. Conventional gateways may include hardware and/or software that enables devices that use different protocols to communicate with one another. For example, a gateway may permit a device to interact with different radio frequency (RF) devices with different RF protocols. Connecting devices to conventional gateways typically is cumbersome and prone to error.

Aspects of the present disclosure address these and other shortcomings of conventional gateways and related systems by providing an automated learning universal gateway. This gateway can learn about a protocol, an application programming interface (API), and a device from various sources, such as the web, based on machine learning methods. Further, the gateway can provide recommendation systems to work with heterogeneous protocols, APIs, and devices.

Accordingly, some embodiments disclosed herein provide an environment that enables automatic device configurations where the gateway can automatically identify a new device via picture, barcode, Quick Response (QR) code, etc. When a user desires to add a new device, she can take a picture of the device or scan the QR code or barcode. Then the gateway connects to the cloud to automatically download the driver to connect the new device. Moreover, connections with other existing devices or services can be enabled via personalized, user-friendly interfaces. Communication interfaces of the device can be identified automatically via the device's specification and the gateway can select the communication interface to connect to the device. Also, the software to interact with the device can be downloaded to the gateway. The software could be generated via API learning methods. Alternately, the software can reside at the backend and the gateway may communicate with the device via the software at the backend system The gateway may ease the process of connecting to a new device by automatically identifying the new device and enabling the connection to the device. The gateway can be used in the environment such as in a home (Home Gateway), a vehicle (Automotive Gateway), and any IoT environment that uses a gateway to communicate between devices and/or cloud services. For example, in the case of home gateway, a user device, such as a mobile device or a tablet may serve as a universal home gateway.

Other advantages of the present disclosure include automated identification of a new device and autonomous configurations, learning capability for the recommendations of connections and services, support of multiple IoT ecosystems via automated protocol translations, a computation platform to support obsolete IoT devices (i.e., devices that do not receive continuous support of maintenance from the original vendor), a storage space to host the data generated from devices/services and to save costs of cloud service (e.g., cloud video recording service), more complex functions (e.g., multiple triggering conditions, computer vision, etc.), and increased protection of privacy by keeping essential data at the gateway or at a local storage.

Some embodiments described herein enable integration of devices that communicate on multiple protocols. Additionally, once incorporated into a device configuration, the devices may communicate peer-to-peer without necessarily passing through a central system.

FIG. 1 illustrates a block diagram of an example operating environment 100 of a system, arranged in accordance with at least one embodiment described herein. As depicted in FIG. 1, the operating environment 100 may include one or more devices 106, a gateway 110, one or more web services 115, a network 124, a system server 125, a user database 128, a recommendation database 130, a local database 136 and a cloud 140. The gateway 110, web services 115, system server 125, and cloud 140 (collectively, "environment components") may be communicatively coupled to one another via the network 124.

The devices 106 may include a computer-based hardware device that includes a processor, memory, and communication capabilities. Each of the devices 106 may be coupled to the network 124 to communicate data with any of the other components of the operating environment 100. Some examples of the devices 106 include a light bulb, a lighting system, a door lock, a water heater, a sprinkler system, an air-conditioner, a thermostat, an alarm clock, a window shade, a switch, a smoke alarm, a camera, an egg minder, an electrical outlet, a personal (e.g., piggy) bank, a propane tank, an alarm, a personal proximity sensor, a door sensor, a biometric sensor, a mattress, a mobile device, an automotive sensor, a clock, a cooking device, an electrical breaker, a personal alert sensor, a motion sensor, a calendar, a television, a radio, a radio frequency identification (RFID) tag/RFID detector, a vehicle, an electric vehicle charger, a distributed generator (e.g. solar panel), a distributed energy storage (e.g., battery), and a thermometer.

The devices 106 may communicate via one or more communication protocols. For example, in some embodiments, the devices 106 or some subset thereof may be furnished by a vendor. The devices 106 may be furnished for a specific function and/or for use with one or more of the other devices 106. The devices 106 furnished by the vendor may communicate via a specific communication protocol.

Some communication protocols may be compatible with other communication protocols. For example, a first protocol from the first device 106A may be translated into a second protocol of the second device 106B. However, other communication protocols may not be compatible with all the other devices 106 and/or with other communication protocols. In circumstances in which two devices 106 communicate using two different but compatible communication protocols, the gateway 110 may be deployed to enable communication therebetween.

The gateway 110 may be accessible via the network 124, and thus physically located remotely. The gateway 110 may include any system or device that enables communication between the devices 106 using different communication protocols. The gateway 110 may include other devices that are used in the communication between the devices 106. For example, the gateway 110 may include a protocol and/or signal translators, an impedance matcher, a rate converter, a fault isolator, and the like. The gateway 110 may further include one or more configuration parameters that may dictate which of the devices 106 the gateway 110 may communicate with and the one or more steps to be performed to enable communication with the devices 106, for instance. The gateway 110 may also include a physical gateway that may be accessed locally (e.g., non-cloud-based).

Device configurations may be constructed at least partially by the gateway 110 based on input of the user such that the devices 106 communicate one or more specific types of data. For instance, the devices 106 deployed as sensors may communicate a signal representative of a measured condition, the devices 106 deployed to perform a specific operation may be configured to receive a control signal, and the devices 106 deployed as a controller may receive a condition upon which operation of an appliance may be varied.

The one or more web services 115 may include a service offered by an electronic device to another electronic device, communicating with each other via the network 124 (e.g., the World Wide Web). The one or more web services 115 typically provide an interface to the gateway 110 and/or the system server 125. Web services may include provision of various types of information to the gateway 110 and/or the system server 125, such as weather data, sunrise/sunset data, etc.

The network 124 may include any communication network configured for communication of signals between any of the components (e.g., 106, 110, 115, 125, 128, 130, 136, and 140) of the operating environment 100. For example, following construction of a first device configuration, a first device 106A, the gateway 110, and a second device 106B may communicate via the network 124. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the devices 106, cloud server communication, or gateway 110.

The system server 125 may include a hardware server that includes a processor, memory, and communication capabilities. In the illustrated embodiment, the system server 125 may be coupled to the network 124 for communication with one or more of the user devices 106, the gateway 110, the cloud 140, and the web services 115.

The cloud 140 may include a cloud service. Many IoT device vendors provide their own cloud service. Various data could be collected at various cloud service servers, such as device information, device usage information, etc.

The system server 125 may include or be coupled to a user database 128 and/or a recommendation database 130. In general, the user database 128 may include capabilities of one or more of the devices 106 and interoperabilities therebetween. The gateway 110 may include or be coupled to a local database 136.

The databases 128, 130 and 136 may include any memory or data storage. The databases 128, 130 and 136 may include network communication capabilities such that other components in the operating environment 100 may communicate with the databases 128, 130 and 136. In some embodiments, the databases 128, 130 and 136 may include computer-readable storage media for carrying or having computer-executable instructions or data structures stored thereon. The computer-readable storage media may include any available media that may be accessed by a general-purpose or special-purpose computer, such as a processor. For example, the databases 128, 130 and 136 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in any of the databases 128, 130 and 136.

The databases 128, 130 and 136 may store various data. The data may be stored in any data structure, such as a relational database structure. For example, the user database 128 may include users' usage patterns. The users' usage patterns may not personally identify any particular user and may be anonymized. An example of usage pattern may include a type of device a user operates, settings of the device, a time and/or the location of operations, etc. For example, if a user may frequently operate two appliances or services separately but when these two events happen sequentially, the system server 125 may recognize a relationship between the two appliances or services and may enable automated control.

In another example, the recommendation database 130 may include recommendations contributed from a community (either anonymized users or open forum). For example, a popular recipe may connect two devices and/or services. If a user owns these two devices and/or services and has preferences as a group that subscribes to the recipe, then the system server 125 may recommend the recipe to the user. For example, a user may like dancing and he/she owns both a smart speaker and a smart LED lighting. If a recipe exists to control both the smart speaker and the lighting, the system server 125 may recommend this recipe to the user.

In a further example, the local database 136 may include some or all of the usage patterns, recommendations, usage history, or any other data.

In operation, the gateway 110 and/or the system server 125 may use machine learning for the recommendations of connections and services. The recommendations include the suggestions of connections for a new device with other existing devices and the configurations of rules for the interactions between devices/services. The recommendations can be learned from existing similar services (e.g., IFTTT recipes), community, aggregation of other anonymized users from other gateways, and the user's own behavior.

With respect to machine learning methods, the gateway 110 and/or the system server 125 may include learning capability for any information or features pertaining to a device to be connected to the gateway 110, such as device identification, communication interface identification, API communication, function enabling, connection recommendations, etc. In at least some embodiments, a device 106 may be automatically configured instead of conventional approaches that typically use manual device configurations. The recommended configurations are provided by software on the gateway 110 with the learning capability where the software learns from API documentation and its descriptions. For example, the gateway 110 may use a website of an API to identify or learn about functionality of a device.

To learn from an existing service, the gateway 110 and/or the system server 125 may identify recipes in a database, such as the cloud 140. The gateway 110 and/or the system server 125 may record recipes found in the existing database (e.g., such as IFTTT recipes) in a global graph, $G_c$, as further described with respect to FIGS. 2 and 3. Each recipe may include the possible connections in three layers and the parameters in the function layer. An example recipe may be "if you leave home (by location information), start home security system."

To learn from crowds, the gateway 110 and/or the system server 125 may record anonymized users' settings in the global graph, $G_c$. When searching for the recommendations for the user, the gateway 110 and/or the system server 125 can compare the user with others. Based on the group similar to the user (e.g., environment, preferences, etc.), the anonymized settings in this group could be provided to the user. In an example of how to measure the similarity by clustering, the gateway 110 and/or the system server 125 could cluster all the users based on several criteria, such as the types of devices they own, estimated age of the users, income level of users, life style of the users, etc. Each criterion can be discretized into several classes, such as income, age, etc. or classified into a few classes, such as life style (e.g. based on indication of active hours). The gateway 110 and/or the system server 125 may cluster the user to the similar group for the user. In at least one embodiment, a gateway may synchronize its data to the gateway 110 and/or the system server 125 in order to suggest its own finding devices/recipes to other users. For instance, the gateway 110 and/or the system server 125 can learn from neighbors (in one area), the time turn on/off a device, or a time to tune to a popular TV channel.

To learn from a history of user usages, the gateway 110 and/or the system server 125 may monitor or record users' manual operations to identify any patterns of automation, e.g., find out a correlation in time or location for two events. When certain routines of a user can be identified, the gateway 110 and/or the system server 125 may suggest automated recipes to the user.

In at least one embodiment, complex operations may be run at the gateway 110 or jointly with the system server 125. Example complex operations may include multiple conditions to trigger multiple actions, or specific functions can be run at the gateway to trigger certain actions, or automatic diagnostics of errors.

The gateway 110 may consider multiple conditions to trigger one action. The conditions can be any logical operations. For instance, the gateway 110 may identify a user's car location and the user's phone location simultaneously to open both the user's garage door and house entrance door.

The gateway 110 may run specific functions to trigger certain actions. For example, the gateway 110 may be located in a vehicle. The gateway 110 may process captured videos from a vehicle camera. By running computer vision software at the gateway, certain conditions can be detected. When a certain condition is met, it may trigger actions. For example, when the vehicle camera observes other car accidents, such video can be uploaded to a cloud server. In another example, when the vehicle detects the occurrence of an accident (e.g., from the sensor data), the videos before and after the accident can be uploaded to a server. Notifications can be sent to family members/friends/rescue, etc., via the gateway 110. In the case of senior care, when a fall detection sensor detects an abnormal event, the gateway 110 may look for a location of the senior via cameras and/or other sensors 106 installed at the senior's house and continuous monitoring the status of the senior. Based on the situation at the sensor (e.g., no movement for a certain period), various follow-up actions may be triggered, such as an alarm sound, a notification being sent to family/friends/hospital, etc. If a mild situation is observed, the gateway 110 may facilitate a conversation between the senior and a caregiver to diagnose the conditions of the senior, such as via simple Q&A dialog (e.g. asking if the senior is okay).

The gateway 110 may automatically diagnose errors. For example, the gateway 110 may monitor various activities, and may be able to suggest how to troubleshoot problems based on what other users may have experienced before. This is a dynamic way to support diagnosis based on dynamic knowledge, and is different from static, documentation-based diagnosis.

Modifications, additions, or omissions may be made to the operating environment 100 without departing from the scope of the present disclosure. For example, the operating environment 100 may include any number of the described devices and services. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

Figure 2:
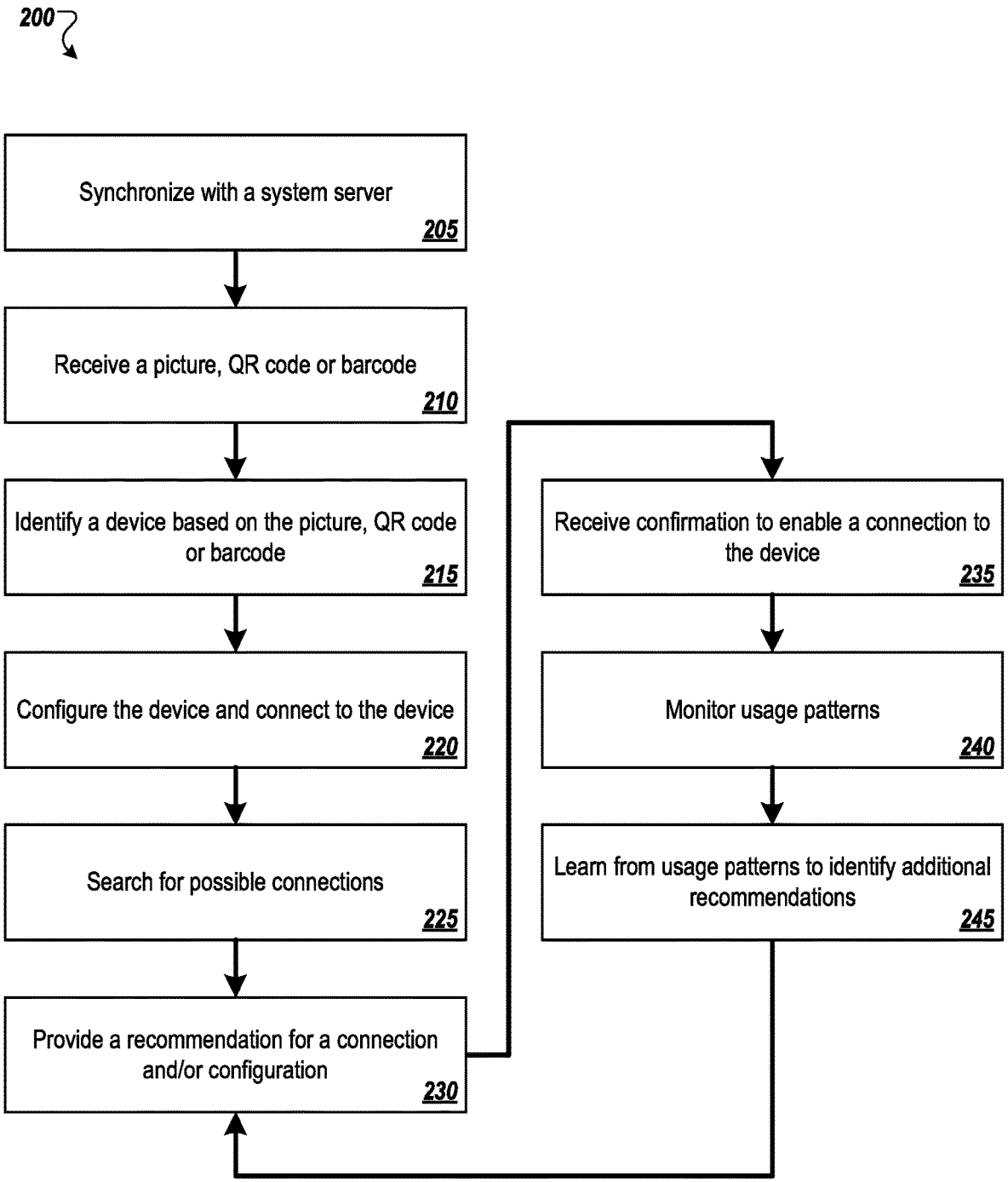
FIG. 2 illustrates a flow diagram of an example method related to an automated learning universal gateway.

FIG. 2 illustrates a flow diagram of an example method 200 related to an automated learning universal gateway. The methods may be performed by processing logic that may include hardware (circuitry, dedicated logic, etc.), software (such as is run on a general purpose computer system or a dedicated machine), or a combination of both, which processing logic may be included in the operating environment 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation. The method 200 may be performed, at least in part, by processing logic in a server, such as the server 125 or gateway 110 of FIG. 1.

The method 200 may begin at block 205, where the processing logic may synchronize with a system server. After powering on, the processing logic may connect to a system server (e.g., the system server 125 of FIG. 1) and synchronize with one or more databases (e.g., the user database 128, the recommendation database 130) associated with the system server 125.

At block 210, the processing logic may receive a picture, Quick Response (QR) code or barcode, or any other graphical or visual representation of a device. When a device is added to a system (e.g., the operating environment of FIG. 1), the processing logic may identify the device by the graphical or visual representation. For example, the graphical representation may include a picture or image of the device. In another example, the visual representation may include a graphic or code associated with the device (e.g., a QR code, barcode). In at least one embodiment, a system administrator, wishing to add the device to the system, sends the graphical or visual representation of the device to the processing logic via a user device. In at least one embodiment, the user may capture a picture of the device itself via a camera and send the captured picture to the processing logic.

At block 215, the processing logic may identify a device based on the picture, QR code or barcode, or other graphical or visual representation of the device. The processing logic may use the picture, QR code or barcode, or other graphical or visual representation of the device to identify characteristics of the device, such as a make, model, supported communication interface, API, etc. The processing logic may connect to a data storage (e.g., the local database 136 or the cloud 140 of FIG. 1) to download a driver to connect the new device.

At block 220, the processing logic may configure the device and connect to the device. The processing logic may configure the device based on a driver obtained at block 215. Once the driver is installed and configured, the processing logic may connect to the new device. In at least one embodiment, the processing logic may select a best communication interface as the communication method to access the device. The device driver (or the software of how to access the device's API) is downloaded to a gateway.

At block 225, the processing logic may search for possible connections for the device. For example, the processing logic may identify existing connected devices and services. The processing logic may then search for the possible new connections between the new device and existing devices and/or services. The system server may maintain various versions of a "connection graph" to record the connections between devices, services, or device-service, etc. In at least one embodiment, the graph can include a record of the possible connections learned from the community (either anonymized users or open forum or "IFTTT" recipes), called $G_c$ (graph of community). Another embodiment of the connection graph can include the connections of the user's gateway itself, called $G_u$ (graph of user). By adding a new node, x (the newly added device), to $G_u$ and comparing $G_u$ by $G_c$, the processing logic may use the possible new connections for the new node x with other devices/services. The possible connections can be identified at the graph of either logic level or device/service level.

At block 230, the processing logic may provide a recommendation for a connection and/or configuration for the device. The processing logic may receive the recommendation from the system server. The system server may generate the recommendation. To generate the recommendation, the system server may compare the configurations of the gateway with other users' configurations to provide the recommendations of the connections and/or configurations. The processing logic may provide the recommendation to a client device. The client device may present the recommendation via a graphical user interface. The client device may receive a confirmation or acceptance of the recommendation and send the confirmation or acceptance to the processing logic. The processing logic may cause the device to be configured according to the confirmation or acceptance received from the client device. A hierarchy of multi-levels connection graph (see e.g., FIG. 3) may be maintained at 3 levels: category, device/service, and function levels. A user who adopts a connection is associated with the connection and the processing logic may cause the connection graph to be updated accordingly. For example, the processing logic may search for a group of all users closest to the user (with the newly added device) based on various criteria, e.g. preferences, installed devices, etc. Based on the configurations of the group, the new connections with the new device may be suggested by the processing logic. The connections that have been adopted by a higher number of people may indicate a higher likelihood (high priority) that the connection may be of use to the user. Additional features such as provision of computation, storage, function, etc. can be offered by the processing logic to the user. For instance, instead of using the cloud video recording function, the gateway can offer local storage at a gateway. Another example is that a specific executable function, e.g., using computer vision or speech recognition to recognize a particular event, can be downloaded to the gateway and the processing logic may execute the function locally.

At block 235, the processing logic may receive a confirmation to enable a connection to the device. In at least one embodiment, the processing logic may provide tutorial information based on the logic level information to the user for assistance in making the decision. The processing logic may enable connections with other existing devices or services based on the user's selections via a personalized, user-friendly interface.

At block 240, the processing logic may monitor usage patterns associated with the device. The processing logic may continuously monitor the device and store any usage in a data storage. At block 245, the processing logic may learn usage patterns to identify additional recommendations. The processing logic may analyze the collected usage for various usage patterns. Through learning from usage patterns from multiple systems and/or associated with more than one user, the processing logic may identify a new recommendation of service or a new connection to make the user work more efficiently. For instance, if certain events happen closely in time, the processing logic may observe the patterns and recommend a new automation configuration to make the flow more efficient. The processing logic may provide the new recommendation to the client device at block 230 and may receive a confirmation of the new recommendation at block 235.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special purpose or general purpose computer including various computer hardware or software modules, as discussed in greater detail below.

Figure 3:
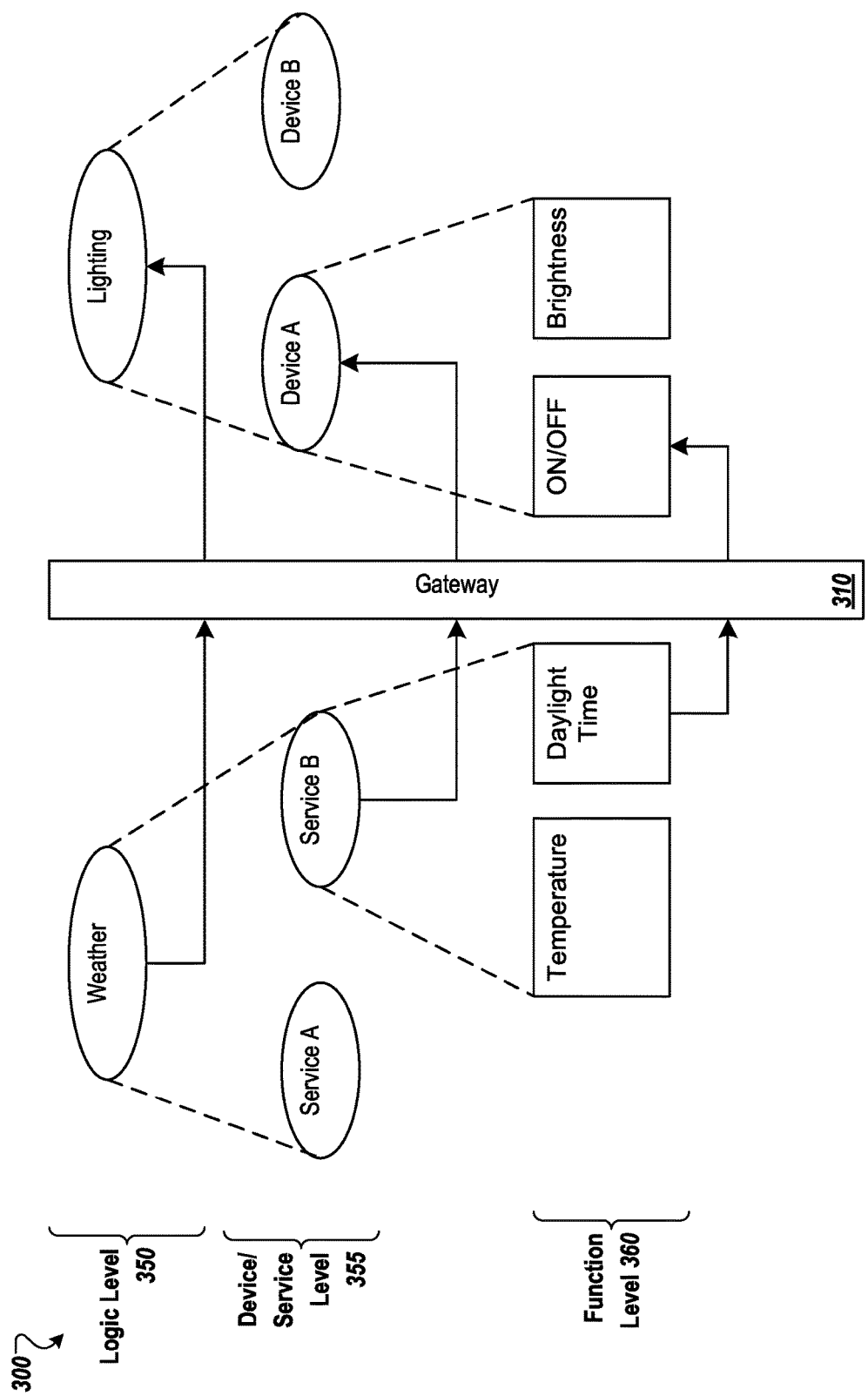
FIG. 3 illustrates an example connection graph that represents a relationship of connections in a system.

FIG. 3 illustrates an example connection graph 300 that represents a relationship of connections in a system. As illustrated, the connection graph 300 includes three levels but the connection graph 300 may include any number of levels. For ease in explanation, the connection graph 300 is described with respect to weather monitoring and lighting control. Any type of system, application or configuration is contemplated. The connection graph 300 may include a representation of a gateway 310, which may include the gateway 110 of FIG. 1.

As illustrated, a first level may include a logic level 350. The logic level 350 may include "weather" and "lighting" categories. The logic level 350 may include a representation of how the gateway 310 may control lighting based on information related to weather.

A second level may include a device and/or service level 355. The device and/or service level 355 may include devices and/or services that fall within the categories of the logic level 350. For example, the device and/or service level 355 includes a first weather service A, a second weather service B, a lighting device A and a lighting device B. The device and/or service level 355 may include a representation of how the gateway 310 may use the information from a weather service to control a light.

A third level may include a function level 360. The function level 360 may include a description of one or more functions of each of the services and/or devices of the device and/or service level 355. For example, the function level 360 may include a temperature and daylight time of the service B and ON/OFF and Brightness of the device A. The device and/or service level 355 may include a representation of how the gateway 310 may automatically turn on a light, such as at sunset.

Figure 4:
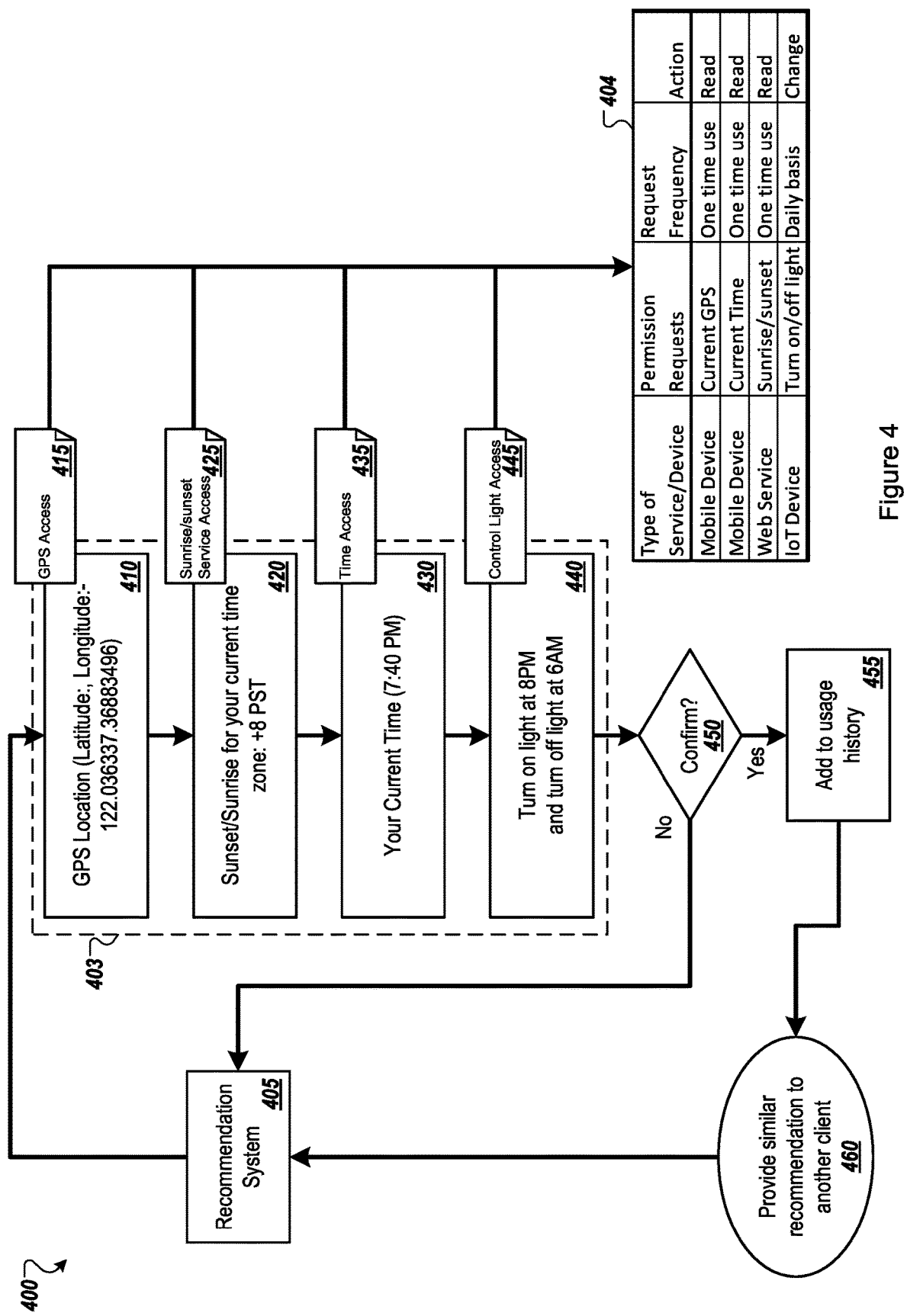
FIG. 4 illustrates an example system in which a visual presentation of complex operations may at least partially be presented to a user via a display device.

FIG. 4 illustrates an example system 400 in which a visual presentation 403 of complex operations may at least partially be presented to a user via a display device. When complex operations are recommended or deployed, end users may not fully understand the potential effects, impacts, or benefits. The visual presentation 403 and/or simulation of the complex operations may help the user to decide whether to accept the configurations of complex operations.

In at least one embodiment, the visual presentation 403 may include a flow chart presentation 403 and/or access rules 404 that may be generated by a recommendation system 405. The recommendation system 405 may include the gateway 110, the system server 125 or any other component of the operating environment 100 of FIG. 1. The flow chart presentation 403 may include a location determination 410, which may include a GPS location. The location determination may include accessing a GPS device (e.g., device 106) to determine the location. The flow chart presentation 403 may also include a determination of a sunrise and/or sunset 420 for the location determined at 410. The determination of a sunrise and/or sunset 420 may include accessing a sunrise and/or sunset service 425, which may be a web-based service that provides sunrise and/or sunset information. The flow chart presentation 403 may also include determination of a current time 430, which may include accessing a clock 435. The flow chart presentation 403 may also include adjusting power for a light 440, which may include turning off a light at a predetermined time and turning on the light at a second predetermined time. Adjusting the power for the light may include accessing a light controller 445.

The access rules 404 may provide a summary of the tasks to be performed and devices or services to be accessed to execute a recommendation. As illustrated, the access rules 404 include accesses to a mobile device or an IoT device, various permission requests (e.g., current GPS location, current time, current temperature, sunrise/sunset, turn on/off light), a frequency in which to perform an operation (e.g., once, periodically), and an action to take (e.g., read, write, modify).

The visual presentation 403 may also include an animation-based presentation. In at least one embodiment, a simple animation (e.g., GIF) can be used to represent one condition/operation in the logic level. By combining the animations to create a short video clip, users can easily understand the whole procedure.

The visual presentation 403 may also include a simulation-based method. In some embodiments, trigger conditions may rarely happen so the users can enable the trigger conditions manually to simulate the conditions. Then, the triggered operations are executed and the users can see the effects.

At block 450, the user may confirm or decline the recommendation depicted in the visual presentation 403. The user may confirm or decline the recommendation by providing input to a user device. When the user confirms the recommendation ("YES" at block 450), the recommendation system 405 may add the confirmation of the recommendation to a usage history for the user at block 455. At block 460, using the usage history, the recommendation system 405 may provide the same or similar recommendation to another client or user. When the user declines the recommendation ("NO" at block 450), the recommendation system 405 may add the declination of the recommendation to a record for the user, which may be the same or different as the usage history.

Figure 5:
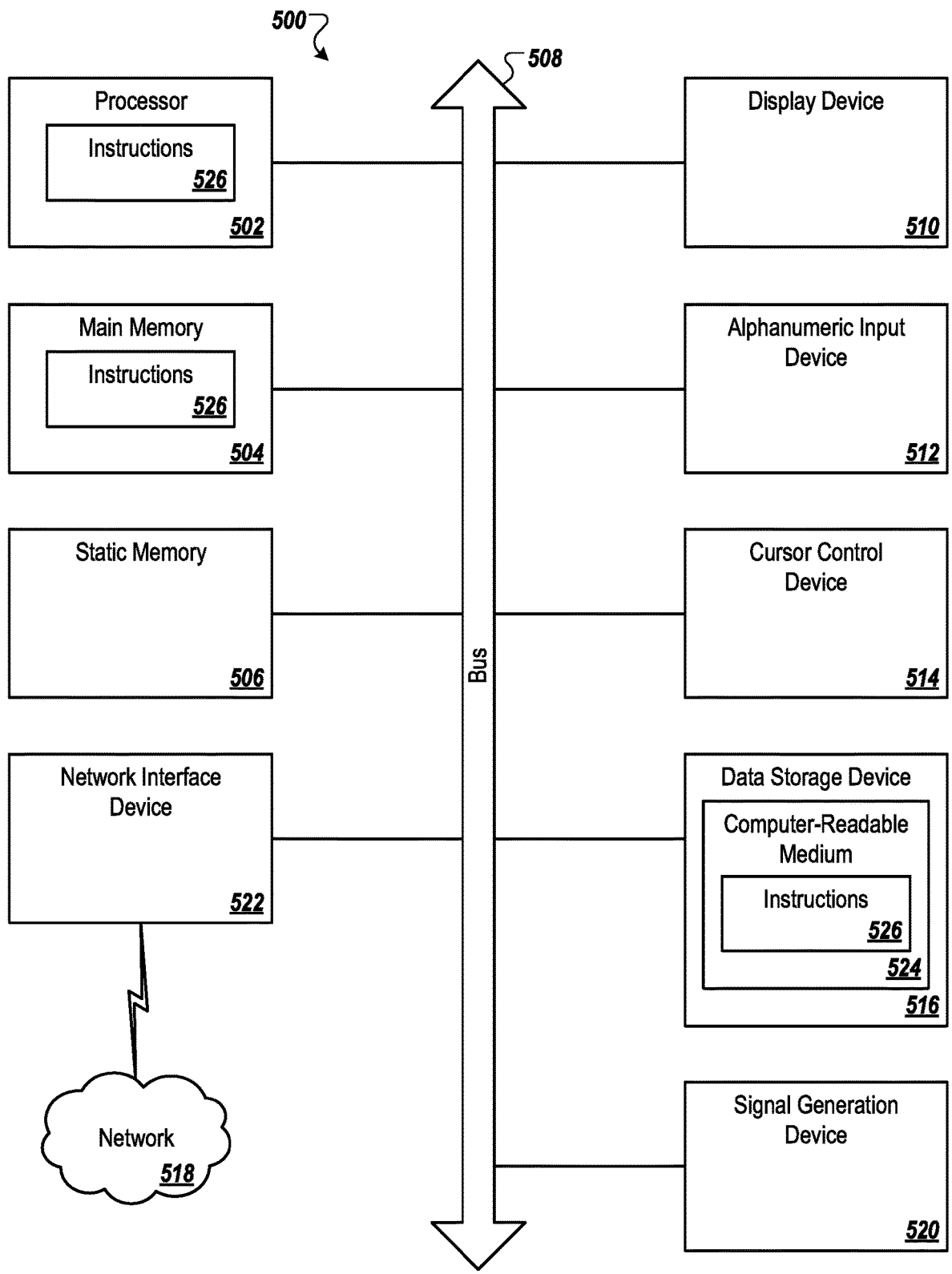
FIG. 5 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 5 illustrates a diagrammatic representation of a machine in the example form of a computing device 500 within which a set of instructions, for causing the machine to perform any one or more of the methods discussed herein, may be executed. The computing device 500 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In one implementation, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 (e.g., gateway 110, system server 125) embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A gateway, comprising:
    a memory;
    a communication interface; and
    a processor operatively coupled to the memory and the communication interface, the processor being configured to perform operations comprising:
        receive, via the communication interface, a graphical representation of a device to be connected to the gateway, wherein the graphical representation of the device includes a photograph of the device;
        identify an identifier of the device based on the graphical representation by using the photograph of the device to locate a record for the device in an electronic data storage;
        search, via the communication interface, for a possible connection between the identifier of the device and an available service or second device, wherein searching for the possible connection between the identifier of the device and an available service or second device includes searching a usage history;
        provide a recommendation for the possible connection via a graphical user interface, wherein the recommendation for the possible connection is determined based on the searching of the usage history; and
        receive an electronic confirmation to enable the possible connection of the device.

2. The gateway of claim 1, wherein the graphical representation of the device includes at least one of a Quick Response (QR) code, or a barcode.

3. The gateway of claim 1, wherein when identifying the device based on the graphical representation, the processor is configured to identify characteristics of the device from the record in the electronic data storage.

4. The gateway of claim 3, wherein, the characteristics of the device include at least one of a make, a model, a supported communication interface, or an application programming interface.

5. The gateway of claim 1, wherein when identifying the device based on the graphical representation of the device, the processor is configured to:
    identify a driver for the device at a remote data storage;
    download the driver from the remote data storage;
    configure the driver at the gateway;
    select the communication interface; and
    connect the device.

6. The gateway of claim 1, wherein when searching for the possible connection between the device and the available service or second device, the processor is configured to identify an existing connected device or services based on a connection graph that includes connections between devices and services.

7. The gateway of claim 6, wherein the connection graph includes a record of at least one of: possible connections learned from a community, or current connections of the gateway.

8. The gateway of claim 1, wherein the processor is further configured to perform operations comprising:
    monitor usage patterns associated with the device; and
    create a new recommendation based on the usage patterns.

9. A method, comprising:
    receiving, via a communication interface, a graphical representation of a device to be connected to a gateway, wherein the graphical representation of the device includes a photograph of the device;
    identifying an identifier of the device by using the photograph of the device to locate a record for the device in an electronic data storage;
    searching, via the communication interface, for a possible connection between the identifier of the device and an available service or second device, wherein searching for the possible connection between the identifier of the device and an available service or second device includes searching a usage history;

providing a recommendation for the possible connection via a graphical user interface wherein the recommendation for the possible connection is determined based on the searching of the usage history; and receiving an electronic confirmation to enable the possible connection of the device.

10. The method of claim 9, wherein the graphical representation of the device includes at least one of a Quick Response (QR) code, or a barcode.

11. The method of claim 9, wherein identifying the device based on the graphical representation comprises identifying characteristics of the device from the record in the electronic data storage.

12. The method of claim 11, wherein, the characteristics of the device include at least one of a make, a model, a supported communication interface, or an application programming interface.

13. The method of claim 9, wherein identifying the device based on the graphical representation of the device comprises:

identifying a driver for the device at a remote data storage;
downloading the driver from the remote data storage;
configuring the driver at the gateway; and
connecting the device.

14. The method of claim 9, wherein searching for the possible connection between the device and the available service or second device comprises identifying an existing connected device or services based on a connection graph that includes connections between devices and services.

15. The method of claim 14, wherein the connection graph includes a record of at least one of: possible connections learned from a community, or current connections of the gateway.

16. The method of claim 9 further comprising:
monitoring usage patterns associated with the device; and
creating a new recommendation based on the usage patterns.

17. A non-transitory computer-readable medium having encoded therein programming code executable by a processor to perform operations comprising:

receiving, via a communication interface, a graphical representation of a device to be connected to a gateway, wherein the graphical representation of the device includes a photograph of the device;

identifying an identifier of the device by using the photograph of the device to locate a record for the device in an electronic data storage;

searching, via the communication interface, for a possible connection between the identifier of the device and an available service or second device, wherein searching for the possible connection between the identifier of the device and an available service or second device includes searching a usage history;

providing a recommendation for the possible connection via a graphical user interface wherein the recommendation for the possible connection is determined based on the searching of the usage history; and receiving an electronic confirmation to enable the possible connection of the device.

18. The non-transitory computer-readable medium of claim 17, wherein the graphical representation of the device includes at least one of a Quick Response (QR) code, or a barcode.

19. The non-transitory computer-readable medium of claim 17, wherein identifying the device based on the graphical representation comprises identifying characteristics of the device from the record in the electronic data storage.

20. The non-transitory computer-readable medium of claim 19, wherein, the characteristics of the device include at least one of a make, a model, a supported communication interface, or an application programming interface.

* * * * *